W. PETERS, dec'd.
H. D. JARVES, Assignee.
Covering for Steam-Boilers.
No. 6,516. Reissued June 29, 1875.
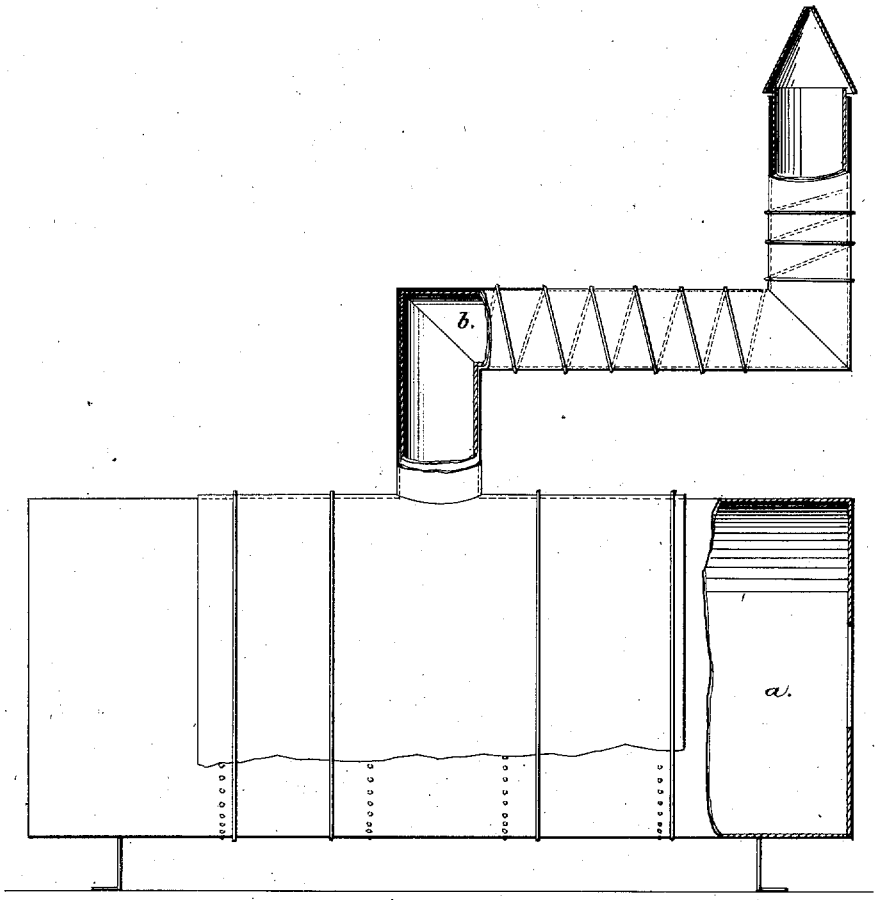
Witnesses:
Charles E. Stratton
A. L. Rice
Wm. Peters. Dec'd.
Inventor:
Horatio D. Jarves
assee.

UNITED STATES PATENT OFFICE.

HORATIO D. JARVES, OF BOSTON, MASSACHUSETTS, ASSIGNEE, BY MESNE ASSIGNMENTS, OF WILLIAM PETERS.

IMPROVEMENT IN COVERINGS FOR STEAM-BOILERS.

Specification forming part of Letters Patent No. 36,322, dated August 26, 1862; reissue No. 6,516, dated June 29, 1875; application filed June 5, 1875.

*To all whom it may concern:*

Be it known that WILLIAM PETERS, of Baltimore, State of Maryland, did invent new and useful Improvements in Covering Steam-Boilers and Pipes, and sheathing vessels with non-conducting and non-combustible material, of which the following is a specification:

Covering or investing the shell of steam-boilers, steam-pipes, cylinders, &c., as practiced by Watt, Eve, and other earlier inventors has been regarded as of considerable value, though subject to objections. When a wood jacket or casing is made use of it is liable to become charred or fired, and thus endanger the vessel, if used on board of a steamship or boat; and when a metal jacket is used and the jacket-space is filled in with sand or earth, the weight of the jacket and its filling makes the objection. One or the other of these objections exists against the use of felt, cloth, brick, and clay, and hence it is very desirable to have an article or substance for such covering which is not open to either of these objections.

It is the object of this invention to meet these requirements with the light and non-combustible material, asbestus, which is also non-conducting in an eminent degree; and this invention consists in the application of it as a covering to steam-boilers, steam-pipes, cylinders, and such other surfaces as it may be useful to invest with non-conducting substances, either to retain the heat or to protect them from heat, combined in sheets or slabs, with hemp or some animal or vegetable fiber, or material or mineral substance of suitable nature and quantity to cause the asbestus to cohere in the form given to it, which may be combined by subjecting the asbestus and the substances used with it to hydraulic or other pressure, the elements of the combination having been exposed to water or some other suitable liquid or fluid, or not so exposed, as may be necessary to put the materials in a proper condition for pressure.

One way of making slabs or plates or sheets of such combination is to place layers of asbestus, and layers of some animal or vegetable fiber or substance, in a tub or vat, the asbestus and the other materials alternating, and then to force through such layers a current of steam or water, and, when the materials have become sufficiently moistened, to take them out and press the mass into such form, slabs, sheets, or plates as is desirable.

Other ways of making this combined covering may be adopted. The character of the material used in combination with the asbestus, and the special form or character of the surface to be covered, will generally indicate the course of preparation to be followed.

The drawings forming part of this specification show a boiler, A, and steam-pipe B, covered, in part, with sheets C of this composition. The thickness of this covering may be such as may be found necessary to prevent the escape of the heat, or to fully protect the surface exposed to the heat. In some instances it may be molded into the form or shape needed as a covering. It can be placed around or upon the surfaces, and there held by bands or wires D D wound about the boiler-pipe or other object, or secured by any convenient means.

In case any part or portion should be injured it can readily be detached from the other part, and its place supplied with new or other pieces.

Plates, slabs, or sheets made of the asbestus, and one or more of the animal or vegetable articles herein named, may be used as a sheathing for seagoing or other ships and vessels.

I claim as the invention of said PETERS—

1. The covering above described, combined with boilers, pipes, and other surfaces by bands or wires, as and for the purposes above described.

2. Asbestus and suitable animal or vegetable fiber or material or mineral substances combined, and combined with and applied to boilers, pipes, and other surfaces, as and for the purposes above described.

HORATIO D. JARVES.

Witnesses:

CHARLES E. STRATTON,

A. G. BISCOE.